United States Patent
Regan (10) Patent No.: US 7,256,374 B2
(45) Date of Patent: Aug. 14, 2007

(54) INDUCTION HEATING APPARATUS FOR CONTROLLING THE WELDING PARAMETER OF TEMPERATURE FOR HEAT TREATING A SECTION OF PIPING

(76) Inventor: Colin Regan, PO Box 264, Wabamum, Alberta (CA) T0E 2KO ( * ) Notice: Subject to any disclaimer, the term of this patent is extended or adjusted under 35 U.S.C. 154(b) by 0 days.

(21) Appl. No.: 10/709,595

(22) Filed: May 17, 2004

(65) Prior Publication Data

US 2005/0252911 A1   Nov. 17, 2005

(51) Int. Cl.
  *B23K 13/01*   (2006.01)
  *H05B 3/10*   (2006.01)
(52) U.S. Cl. ...................... 219/607; 219/535
(58) Field of Classification Search ............ 219/607, 219/535, 529, 643, 644, 59.1; 285/41; 228/60; *B23K 13/01; H06B 3/10*
See application file for complete search history.

(56) References Cited

U.S. PATENT DOCUMENTS

| | | | | |
|---|---|---|---|---|
| 3,519,023 A | * | 7/1970 | Burns, Sr. et al. ............ 138/33 |
| 3,829,654 A | * | 8/1974 | Eisler ......................... 219/386 |
| 5,169,176 A | * | 12/1992 | Brossard .................... 285/21.1 |
| 5,359,179 A | * | 10/1994 | Desloge et al. ............. 219/535 |
| 5,484,506 A | * | 1/1996 | DuPont et al. .............. 156/503 |
| 5,614,120 A | * | 3/1997 | Wenzel ....................... 219/535 |
| 5,820,720 A | * | 10/1998 | Campbell ................ 156/273.9 |
| 5,883,363 A | * | 3/1999 | Motoyoshi et al. ......... 219/529 |
| 6,054,691 A | * | 4/2000 | McGwire .................... 219/535 |

\* cited by examiner

*Primary Examiner*—Daniel Robinson
(74) *Attorney, Agent, or Firm*—J. Jay Haugen; William J. Bundren (57) ABSTRACT

The present invention relates to a novel induction heating apparatus for controlling the welding parameter of temperature for a pre-weld heating operation, interpass operation, or a hydrogen bake-out operation. Specifically, the present invention relates to using a novel induction heating apparatus for controlling this welding parameter. The heating device is comprised of a pair of opposed heating collars placed on either side of a pipe comprising a weld joint. The heating device transfers heat from the collar to the weld joint surface by induction providing a method of controlling this welding parameter.

9 Claims, 8 Drawing Sheets

INDUCTION HEATING APPARATUS FOR CONTROLLING THE WELDING PARAMETER OF TEMPERATURE FOR HEAT TREATING A SECTION OF PIPING

BACKGROUND OF INVENTION

The present invention relates to a heating apparatus for controlling the welding parameter of temperature for a pre-weld heating operation, interpass operation, or a hydrogen bake-out operation. The invention contemplates a novel induction technology for performing the following operations.

As will be apparent to one skilled in the art, the term "pre-weld heating" refers to the operation of preheating a section of pipe to the desired temperature before performing a welding operation upon a section of pipe. For example, in a pre-weld heating operation using P91 crome-moly steel pipe, the pipe is heated to a temperature range between 400 500 degrees Fahrenheit. The term "P91" is used to describe a common type of pipe used in a high-pressure application for transporting oil, gas, or steam. P91 is comprised of a chromium-molybdenum alloy having the chemical composition of 9Cr-1Mo—V (P91).

The term "hydrogen bake-out" refers to a finishing operation on a weld whereby a welded section of pipe in-situ is held at a constant temperature in order to remove any hydrogen impurities from the weld in preparation for a cutting of welding operation. A hydrogen bake-out helps prevent the weld-joint from pre-mature fracturing of the weld-joint or pipe in-situ.

The term "interpass temperature" refers to the temperature of the pipe between welding passes. A "welding pass" is the path taken by a single welding operation. For example, a welding pass for a section of pipe is the circumferential path taken around a weld joint for the pipe.

Prior Art: Several types of flexible electric powered heaters are disclosed in the prior art. For example, unexpired Russian Patent Number 2,115,265 (hereinafter, the '265 patent) issued on Jul. 10, 1998 discloses an electric heater used for the thermal treatment of structures, pipes, steam, gas and petroleum lines in situ for stress relieving only. The '265 patent discloses the use of a detachable ceramic insulator for the electric heater. The ceramic insulators are connected by means of elements in the form of bushes and fixed by catches. Insulator elements are connected according to the dovetail principle.

Accordingly, the prior art also discloses the use of a combined heating and insulating means for heat treating an object. For example, in expired U.S. Pat. No. 3,393,297 (hereinafter, the '297 patent), a heating and insulating means is disclosed for heat treating an object. The '297 patent discloses a flexible resistance wire which is covered by a heat insulating pad for heat transfer to the object to be heat treated. Insulator elements are connected according to the hook-and-latch principle.

Specifically, expired U.S. Pat. No. 4,255,649 issued to Fisher on Mar. 10, 1981 discloses a flexible heating element for use with plastic polyurethane piping. The heating element is comprised of a plurality of ceramic components strung together on a heating wire to form a flexible structure. Accordingly, the applicant modifies the expired Fisher patent and provides a new use for the heating element. Namely, the applicant has modified Fisher to be made amendable to pre-heating metal piping to address the deficiencies in the prior art for existing heating solutions directed towards oilfield piping.

In accordance with the present invention, a heating apparatus is disclosed which is directed towards the pre-welding operation of performing a hydrogen bake-out. The process of performing a bake-out operation is distinguishable from the expired '265 patent which is directed towards a stress relieving operation. In a typical "bake-out" operation the metal piping is heated to a temperature of 600 degrees Celsius, whereas in a typical "stress-relieving" operation, the metal piping is heated to a temperature range between 1200-1400 degrees Celsius.

Accordingly, the apparatus of the present invention is not amendable to be used for performing a stress relieving operation since the heating element would typically degrade or melt under a voltage load required to produce a temperature of 1200-1400 degrees Celsius. Applicant respectively submits that the '265 patent although potentially amendable to produce the temperature of 600 degrees Celsius required for a typically bake-out operation, it inherently does not address many of the prior art disadvantages which will be described herein.

Deficiencies of the Prior Art: Unfortunately, many of the prior art inventions are difficult and cumbersome to apply, remove or relocate from the weld area, which typically may be held within a tightly confined area. Additionally, many of the prior art inventions require a power source requiring the use of heavy machinery to provide a suitable source of power. For example, a generator truck is typically required for voltage requirements exceeding 110 volts. Each truck uses heavy cabling to supply power from the generator mounted on the truck to the heating apparatus which is typically located in a remote location from the weld site. The heavy cabling may present a hazard at the work site since the use of heavy voltage cabling present a safety hazard.

What is required in the Art is a portable heating apparatus for heat treating a section of oilfield pipe which may be easily retrofitted to the site to be heat treated. The heat treating apparatus should be amenable to be easily added, removed, or re-located to a new weld site. Additionally, the heating apparatus should not require the use of a heavy cabling, and/or the requirement of a high-voltage truck for supplying power to the heating apparatus.

In accordance with one aspect of the present invention, it is desirable in the art to have a method and apparatus for controlling a welding parameter such as temperature in order to improve the quality of a weld by controlling the interpass temperature, pre-weld heating operation or hydrogen bake-out operation.

In accordance with another aspect of the present invention, it is desirable in the art to have a method and apparatus for controlling a welding parameter such as temperature wherein the heating device does not require the use of a high voltage truck, and heavy cabling associated with supplying power to the heating device.

In accordance with yet another aspect of the present invention, it is desirable in the art to have a method and apparatus for controlling a welding parameter such as temperature wherein the heating device is easily amendable to be added, removed or re-located during the aforementioned operations.

SUMMARY OF INVENTION

In accordance with the present invention, an apparatus is disclosed for controlling a welding parameter such as temperature for performing a pre-weld heating operation, interpass operation, or a hydrogen bake-out operation. The invention contemplates a novel induction technology for performing the following operations.

In one aspect of the present invention, a heating apparatus is disclosed which is amendable for performing a pre-weld heating operation, interpass operation, or a hydrogen bake-out operation.

In another aspect of the present invention, a heating apparatus is disclosed which does not require the use of a high voltage truck or high voltage cabling to supply the required power to the heating device.

In yet another aspect of the present invention, a heating apparatus is disclosed which is amendable to be easily added, removed, or re-located to a weld site during the aforementioned welding operations.

BRIEF DESCRIPTION OF DRAWINGS

FIG. 3b: FIG. 3a with the fastening means 55.

DETAILED DESCRIPTION

Figure 1:
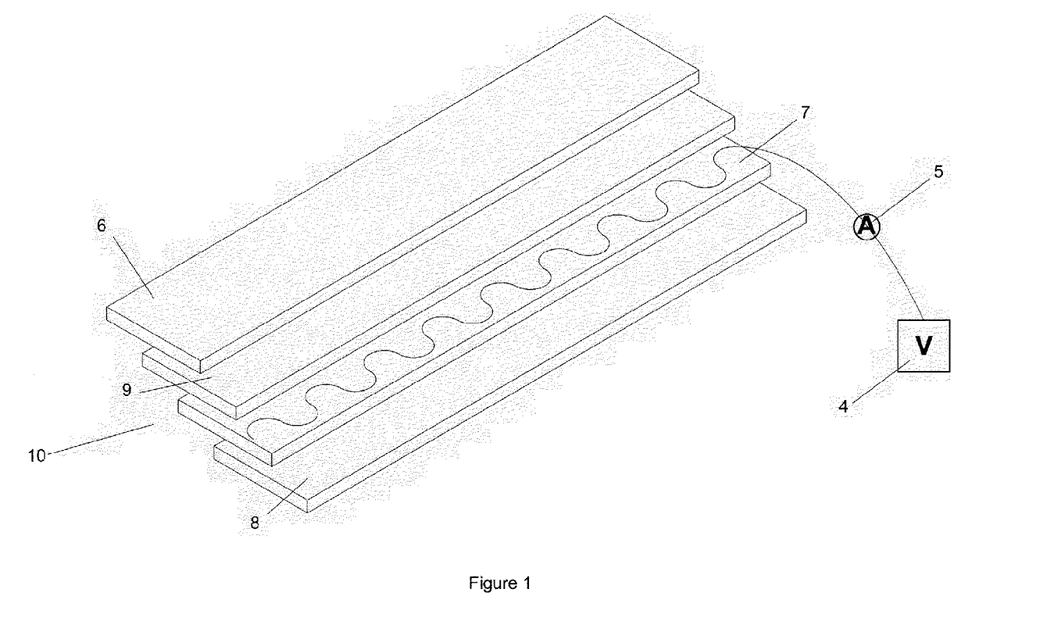
FIG. 1: an exploded side view of a general embodiment of a heating apparatus 10, in accordance with the present invention.

Referring to FIG. 1, a heating apparatus 10 is disclosed in accordance with the present invention. In a general aspect, the heating apparatus is comprised of a thermally conductive heating element 2, a power source 4, and a thermostatic control mechanism 5 for controlling the voltage and current supplied to the heating element.

The heating element 2 is comprised of a resistance wiring network 3. The resistance network 3 provides a mechanism for transferring electrical potential energy into thermal energy. Accordingly, the heating element is further comprised of a thermally conductive core 7 for absorbing, containing, and transferring the thermal energy from the network 3 to a heat transfer element 8. Typically the heat transfer element 8 is contiguous with the core 7. The heat transfer element absorbs thermal energy from the core and transfer the thermal energy absorbed from the core to the surface of the metal piping. The transfer medium is typically comprised of a thermally conductive substrate such as metal is used to provide an inner liner for covering and protecting the core from damage.

The core 7 is covered by an outer cover shell 9 which supports the heating element and protects the heating element from direct contact with the operator. The shell 9 is covered by a thermally non-conductive cover 6 for protecting the hand of the welding operator from direct contact with the heating element 2.

Having reference to FIG. 1, the spatial relationship of the heating element 2, the core 7, the heat transfer medium 8, the shell 9, and the cover 6 is shown. As shown in FIG. 1, an exploded view of the above named elements is shown. The core 7 is sandwiched between the heat transfer medium 8 and the shell 9. The heating element supported by the core is contiguous with both the transfer medium 8 and the shell 9. The cover 6 provides a protective "wrapper" for the "sandwich".

Preferably, the term "contiguous" as defined in the claims is used to mean that the core 7, transfer medium 8, and the shell 9 are situated in combination so as to be in contact with each other. The greater the surface area of the core 7 that is in contact with the surface area of the transfer medium 8, the greater the thermal energy transfer between the core 7 and transfer medium 8. Since, air from the atmosphere acts as an insulator between the various elements, it is preferred that no gaps exist between the "sandwiched" elements.

It is apparent to one skilled in the art, however, that the invention contemplates any spatial relationship between the core 7, transfer medium 8, and the shell 9 to enable the heating functionality of the heating apparatus.

Figure 4:
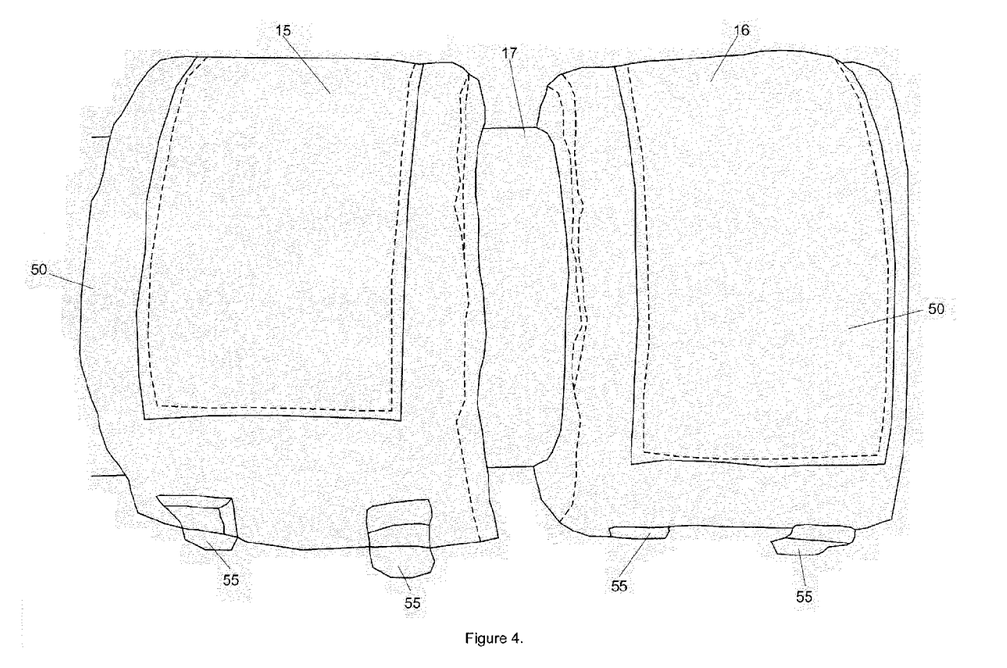
FIG. 4: a bottom view of each heating collar 15 and 16 secured around the weld joint 17 of the piping by the fastening means 55.
Figure 5:
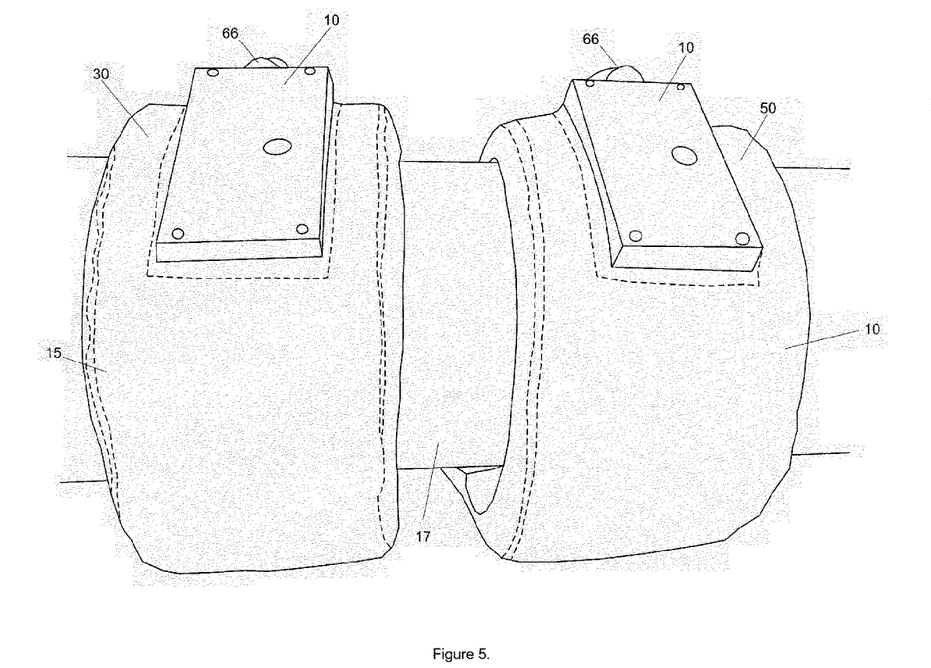
FIG. 5: a top view of each heating collar 15 and 16.
Figure 6:
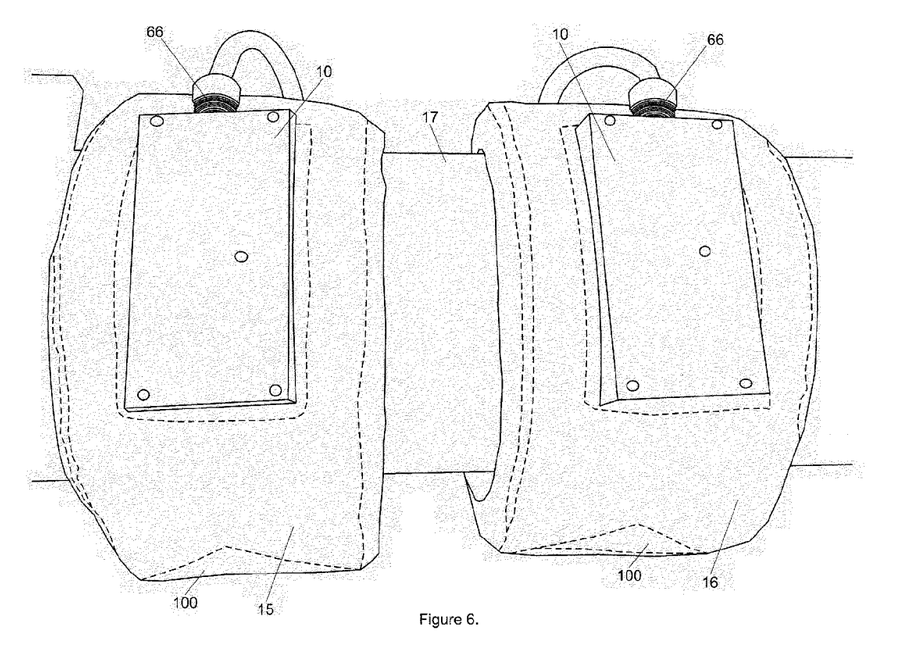
FIG. 6: a side view of each heating collar 15 and 16.

Best Mode of Performing the Invention: In accordance with a preferred embodiment of the present invention, the heating apparatus 10 is shown in FIG. 4 as comprised of a pair of opposed heating collars 15 and 16. Each collar 15 and 16 is placed on either side of the weld joint 17 for preparing the weld joint 17 for a given section of pipe before performing the required pre-weld heating operation.

Figure 2A:
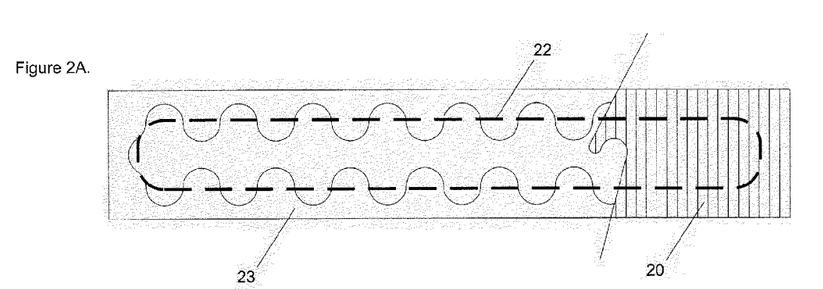
FIG. 2a: a top planar view of the inner core 20.

As shown in FIG. 2a, an exploded view of a heating collar 15 is shown. Each collar is comprised of an inner core 20. The inner core is heated by induction by a heating element 22. The heating element 22 is comprised of a coil wire heating element 23. Typically, the heating element 23 is a high resistance wire which provides a constant heat source to the inner core.

Preferably, the inner core 20 is made of a ceramic material. The use of a ceramic material for the inner core 20 is preferred because of the thermal ability of ceramic material to efficiently absorb, retain, and transfer heat directly from the heating element to the weld site. As required by the pre-welding operation, a method is required for consistently controlling a welding parameter such as temperature.

The ceramic inner core 20 provides a consistent heat source for the piping since the flow and transfer of heat from the ceramic to the piping is controlled by the thermostatic control mechanism 5. For example, the ceramic inner core can be heated to a specific temperature by controlling the thermostatic temperature of the heating element. Conversely, the ceramic inner core can easily be cooled down to a specific temperature by throttling the thermostatic temperature of the heating element.

Figure 2B:
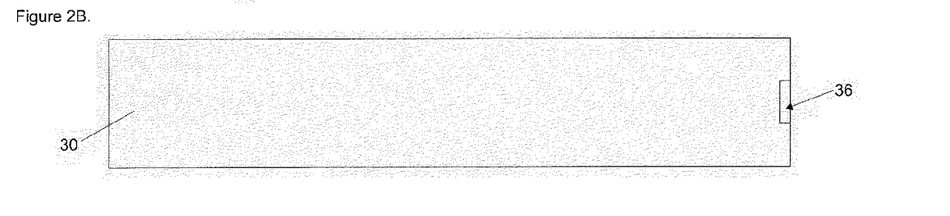
FIG. 2b: a top planar view of the heat transfer element 30.

Referring to FIG. 2b, the heating collar 5 is further comprised of a heat transfer element 30. The heat transfer element 30 provides a thermally conductive material for transferring thermal energy from the inner core 20 to the outer cover. The heat transfer element 30 must be capable of transferring thermal energy from the inner core to the outer cover 40. Additionally, the heat transfer element 30 includes an opening 36 formed on the surface of the heating transfer element 30 for housing the thermostatic control mechanism 5.

Preferably, the heat transfer element 30 is made of galvanized sheet metal. The sheet metal provides an efficient heat transfer substrate. Additionally, sheet metal is preferred because it is amendable to be formed into the desired shape of the piping.

Figure 2C:
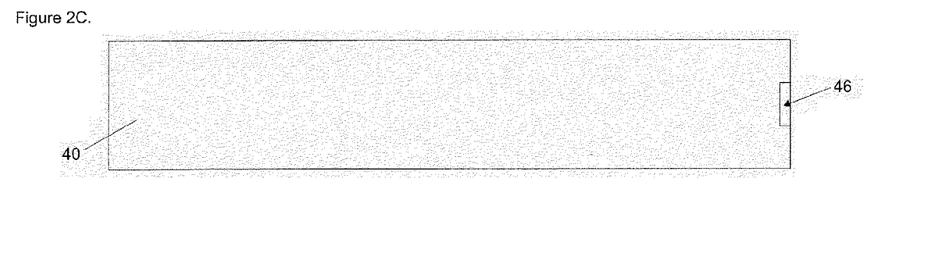
FIG. 2c: a top planar view of the outer cover 40.

Referring to FIG. 2c, the heating collar 5 is further comprised of an outer cover 40. The outer cover 40 provides a protective outer covering for housing the heating element 22, ceramic inner core 20, and heat transfer element 30. The outer cover 40 provides a safety barrier to help protect the hands of the welding operator from direct contact with the heating element 22. Additionally, the outer cover 40 includes a housing 46 for holding the wiring (not shown) and the thermostatic control mechanism 5.

Preferably, the outer cover 40 is made of a stainless steel cover. The stainless steel cover provides a protective layer for supporting the internal components of the heating mechanism. The stainless cover must be capable of being flexible since in most applications the heating collar is secured around the circumferential wall of the piping.

Figure 3A:
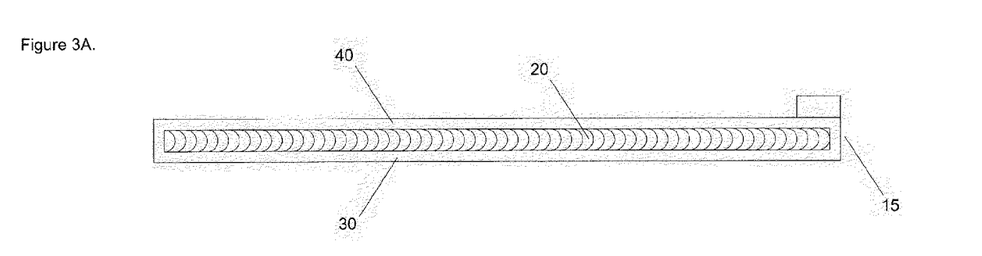
FIG. 3a: a cross-sectional view of a heating collar 15 (or 16), in accordance with a preferred embodiment of the heating apparatus.

Assembly of the Heating Collar: Referring to FIG. 3, a cross-sectional view of the heating collar 5 is shown. The inner core 20 is spaced substantially parallel and contiguous between the heat transfer element 30 and the outer cover 40.

Additionally, to protect the hands of the welding operator from direct contact with the heating element, a protective layer 35 is provided on top of the outer cover 40. The protective layer 35 is comprised of a heat insulating substance. Preferably, the heating insulating substance is comprised of carbo-wool insulation. The carbo-wool insulation is fire retardant and therefore does not degrade under high temperature which makes it suitable as an insulator for the heating collar application.

Finally, an outer housing 50 is provided. The outer housing 50 covers the protective layer 35 comprising the insulation. The outer housing 50 is amendable to make it easy to handle the heating collar.

Figure 3B:
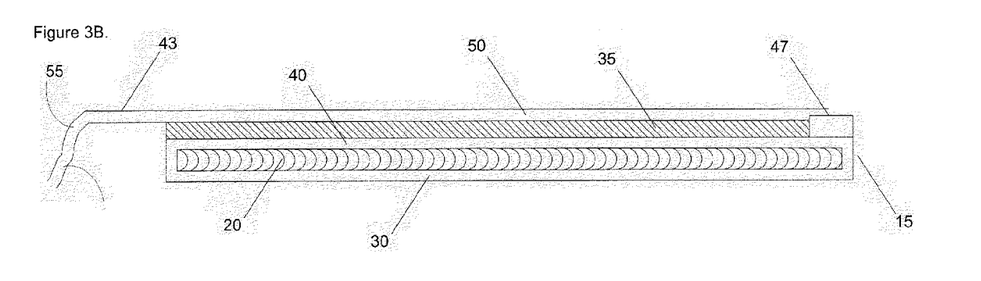

The outer housing 50 terminates in a fastening means 55. The fastening means 55 provides a mechanism for securing the collar around the piping.

Preferably, the fastening means 55 is comprised of a Velcro™ portion that extends beyond a first end 43 of the outer housing 50. The fastening means 55 is further comprised of a second end 47 on the outer housing 50. The second end 47 attaches to a portion of the first end thereby securing the heating collar 5 around the piping.

As defined in the claims, the term "distal end" refers to the first end 43 on the outer housing 50. Similarly, the term "proximal end" refers to the second end 47 on the outer housing 50. Preferably, the distal end and the proximal end of each collar are located at each of the opposed ends of the collar. However, the fastening means 55 contemplates that the first end 43 and second end 47 may be located anywhere along the length of the housing 50.

Proportions of each Heating Collar: It will be apparent to one skilled in the Art that the scale and proportions of each heating collar may be adjusted to accommodate various dimensions of piping. For example, the length (x) of the collar may be adjusted to accommodate various diameters of piping. Additionally, the width (y) of the collar may be adjusted to provide a greater heating surface area on the piping.

The invention also contemplates any geometry for the fastening means 55. For example, the length of the first end 43 may be adjusted to secure around various dimensions of piping. Additionally, the second end 47 may also be adjusted to accommodate the modulated dimension of the first end. For example, a longer Velcro tab for the first end 43 may be provided to accommodate larger dimensions of piping. Also, a greater Velcro fastening area for the second end 47 may be provided to accommodate the first end 43. In this way, the heating collar may be adjustable to accommodate a wide range of piping diameters.

Figure 7:
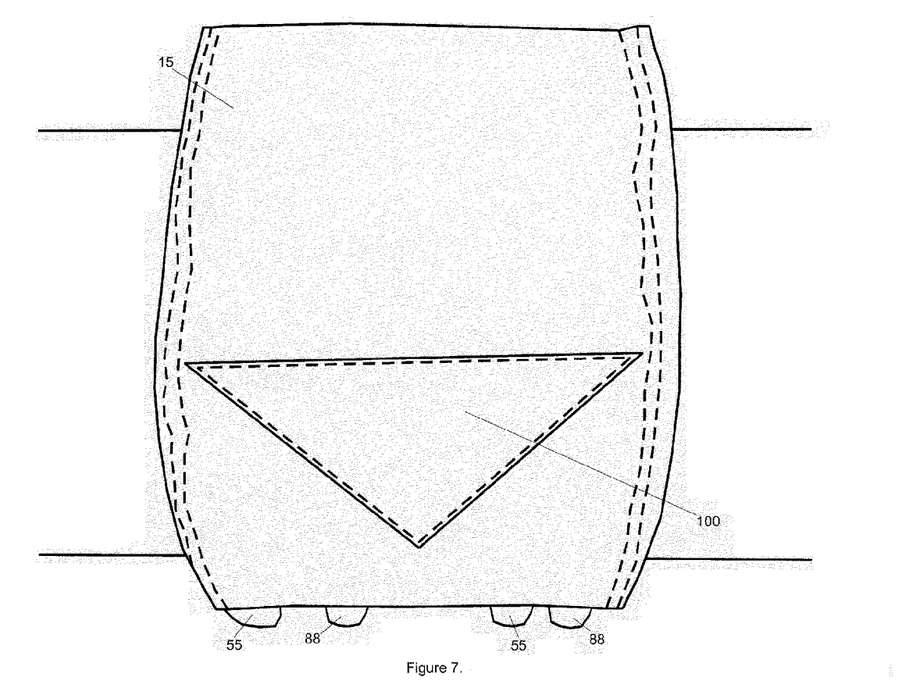
FIG. 7: a side view of a guide on the heating apparatus for assisting the welding operator with the application of the heating apparatus on the piping.

Referring to FIG. 7, a guide 100 is shown for aligning the heating apparatus on the piping. Preferably, each heating collar is aligned on the piping so that the guide, which typically comprises an arrow, is pointing towards the ground. This orientation assists the welding operator with the application of the collars, and assembly of the heating apparatus on the piping. Additionally, by keeping the weight of the collar on top of the piping, the fastening means 55 provides an improved fit on the piping.

Figure 8:
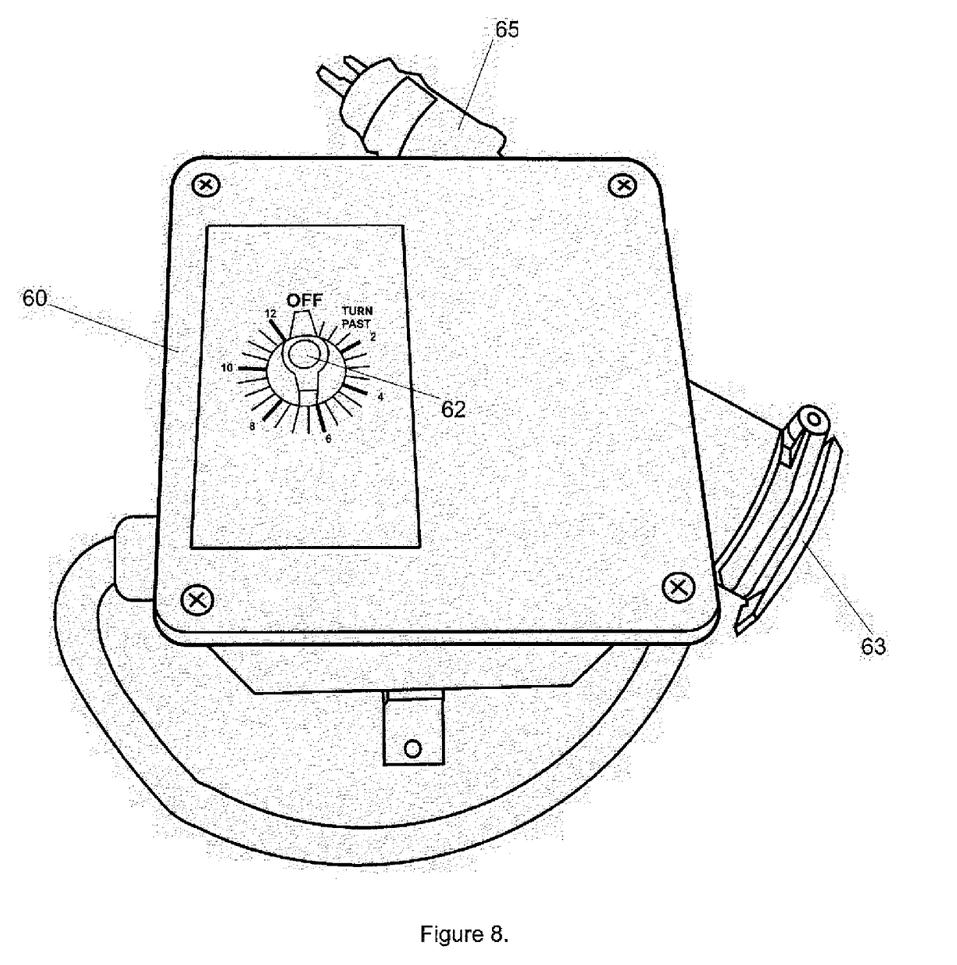
FIG. 8: a top view of the thermostatic control mechanism 60.

Heating Mechanism: Referring to FIG. 8, a heating control mechanism 60 is shown for the invention. The voltage control mechanism 60 provides a thermostatic control device for controlling the temperature of each collar. The control mechanism 60 is comprised of a throttle mechanism 61 for controlling the voltage to the heating element 22. Preferably, the throttle mechanism 61 is a dial 62 which allows the user to select a range of temperature settings for each heating collar 5.

The heating control mechanism 60 is further comprised of a voltage input socket 63. The voltage input socket 63 is comprised of a female end which is mated with a male plug (not shown) from the voltage source (not shown). The heating control mechanism is further comprised of a voltage output socket 65. The voltage output socket 65 is comprised of a male plug that is mated with a second input socket 66 located on and connected directly to the heating element of the heating collar.

Typically, each heating collar is comprised of a dedicated female input socket 66. For this reason, a single heating control mechanism 60 is required for each collar. This configuration allows the welding operator to individually select the pre-heating temperature for each collar of either side of the welding joint. It will be apparent to one skilled in the Art that such a configuration allows the welding operator many degrees of freedom to control the welding parameter of temperature since each individual collar may be pre-set to a different temperature based on the application. However, it will be apparent to one skilled in the Art, that the invention contemplates other configurations for connecting the power source to each collar. For example, the collars may be connected in series such that a single input socket 66 is located on one of the adjacent collars. Each collar would be connected in series to the collar having the input socket 66.

The invention contemplates any type of thermostatic control device which allows the control of voltage and current through the heating element 22. As mentioned previously, the heating element is preferably a heating coil 23 providing exemplary resistance "R" through the wire serving as the heating element. Preferably, the voltage "V" required through the wire does not exceed 110 Volts. The resistance "R" of the wire is chosen to match the thermal conductivity "C" that is required to create the desired temperature in the wire.

Typically, the temperature "T" required for the heating element is one that can drive the piping to the desired pre-welding temperature required to perform the desired operation. The control mechanism 60 is required to adjust the required pre-welding parameter of temperature. The control mechanism allows the welding operator to adjust the temperature of each heating collar 15 and 16 depending upon the thickness, diameter, and material of the piping.

I claim:

1. A heating induction apparatus for controlling the welding parameter of temperature for a section of metal piping, which heating apparatus is comprised of:

a pair of opposed heating collars spaced substantially parallel and contiguous with a weld joint, each heating collar comprising a resistance wire network which is capable of creating a thermal resistance through the network when voltage is applied across the wire, an inner core which is contiguous with the piping and absorbs the thermal heat energy from the network and transfers it to the piping, each heating collar further comprising a protective layer, said protective layer providing a protective outer covering for supporting and protecting said heating collar from the external environment, said protective layer further comprising fastening means for securing each collar securely around the piping; and a thermostatic control mechanism comprising a means for controlling the voltage applied across the network;

wherein the thermostatic control mechanism controls the voltage and modulates the voltage applied across the network thereby controlling the quantity of thermal energy transferred between the inner core and the metal piping.

2. The heating appparatus, as claimed in claim 1, wherein each heating collar is further comprised of an inner core for absorbing thermal energy from the network, said inner core transfers thermal energy to the piping.

3. The heating apparatus, as claimed in claim 2, wherein each heating collar is further comprised of a heat transfer element, said heat transfer element is contiguous with the inner core and transfers thermal energy between the inner core and the piping.

4. The heating apparatus, as claimed in claim 3, wherein each heating collar is further comprised of an outer cover, said outer cover provides a thermally conductive heat transfer substrate for transferring thermal energy from the inner core to the piping.

5. The heating apparatus, as claimed in claim 4, wherein each heating collar is further comprised of an insulating layer, said insulating layer provides a heat insulating layer for protecting the hands of the welding operator from direct thermal contact with the heat transfer element.

6. The heating apparatus, as claimed in claim 1, wherein the thermostatic control mechanism is further comprised of a voltage input plug.

7. The heating apparatus, as claimed in claim 6, wherein the voltage input plug receives voltage from a power source of 110 volts.

8. The heating apparatus, as claimed in claim 1, wherein the fastening means is comprised of both a first end and a second end on the protective layer.

9. The heating apparatus, as claimed in claim 8, wherein the first end is comprised of a Velcro tab secured to a distal end of the protective layer, and a second end secured to a proximal end of the protective layer, said second end is comprised of a Velcro receiving end for receiving the Velcro tab of the distal end for fastening the heating apparatus around the circumference of the piping.

* * * * *